United States Patent [19]

Hewing et al.

[11] Patent Number: 5,350,475
[45] Date of Patent: Sep. 27, 1994

[54] METHOD FOR MAKING A COMPONENT UNIT FOR HEAT EXCHANGER

[75] Inventors: Bernd Hewing, Ochtrup; Siegfried Broda, Haltern, both of Fed. Rep. of Germany

[73] Assignee: 2H Kunststoff GmbH, Ochtrup, Fed. Rep. of Germany

[21] Appl. No.: 15,693

[22] Filed: Feb. 9, 1993

[30] Foreign Application Priority Data

Feb. 12, 1992 [DE] Fed. Rep. of Germany ....... 4204041

[51] Int. Cl.$^5$ .............................................. B29C 47/04
[52] U.S. Cl. .......................... 156/244.11; 156/244.24; 156/244.27; 425/326.1
[58] Field of Search ..................... 156/244.11, 244.24, 156/244.27; 425/326.1

[56] References Cited

U.S. PATENT DOCUMENTS

| | | | |
|---|---|---|---|
| 4,021,178 | 5/1977 | Braun | 425/326.1 |
| 4,563,320 | 1/1986 | Morgan | 156/244.24 |
| 4,741,792 | 5/1988 | Matsuhisa et al. | 156/244.24 |

FOREIGN PATENT DOCUMENTS

| | | |
|---|---|---|
| 1071363 | 2/1980 | Canada . |
| 0554471 | 8/1993 | European Pat. Off. . |
| 3905696 | 10/1989 | Fed. Rep. of Germany . |

*Primary Examiner*—Caleb Weston
*Attorney, Agent, or Firm*—Felfe & Lynch

[57] ABSTRACT

A method for the manufacture of a component unit for heat exchanger, substance exchanger and/or bioreactor systems, with at least two walls joined together and composed of structured thermoplastic sheets, wherein a fused strip issuing from a melt shaping tool on the extruder head of an extruder is introduced, after passing through a precooling distance L, continuously into a strip molding press, and wherein the fused strip is continuously shaped in the strip molding press to form a structured plastic sheet and set by cooling. An apparatus for the practice of the method, wherein a melt shaping tool disposed on the extruder head, a continuously driven strip molding press, a system for the severing, stacking and/or winding and/or folding of the plastic sheets produced, and a cyclically operated bonding system are provided.

10 Claims, 1 Drawing Sheet

METHOD FOR MAKING A COMPONENT UNIT FOR HEAT EXCHANGER

The present invention relates to a method for making a component unit for heat exchanger, substance exchanger and/or bioreactor systems, wherein at least two walls of embossed, thermoplastic surfaces are joined together, and it relates to an apparatus having at least one extruder with an extruder head disposed thereon.

Component units for heat exchanger, substance exchanger and/or bioreactor systems, especially for cooling towers, are disclosed, for example, in DE-OS 39 05 696. The known component unit consists of at least two sparging walls fastened to one another, these being made from a stiff thermoplastic sheet which is equipped with rows of upstanding fastening means. In the superimposed sparging walls fastening means in the form of small, hollow pillars or hollow cones or the like are formed, over which fastening means of the adjacent sparging wall are drawn in a thimble-like or snap-fastener-like manner in a straight line, the sparging walls being configured as corrugated surfaces with apexes and bases running parallel to one another, the said compatible fastening means being disposed both in the apical and in the base areas, and the two sparging walls fastened on one another are disposed with respect to one another so that the lines of the apex and base areas form an angle $\beta$ with one another.

In European Patent Application No. 92 101 667.1, a component unit was proposed by the Applicant of the present patent application, for heat exchanger, substance exchanger or bioreactor systems, wherein two fluid media entering into exchange or reaction with one another can flow through channels formed therein, the component unit having an entrance side and an exit side for the first medium and an entrance side and an exit side for the second medium, the component unit consisting of at least two walls of a thickness d made from thermoplastic sheet materials fastened one on the other, the walls being configured each as corrugated surfaces having apical areas and base areas running substantially parallel, fastening points being disposed in the apical and base areas, and two adjacent walls fastened to one another being associated with one another such that the alignments of the apical and base areas form together an angle $\beta$ between 0° and 120°, the component unit, as seen in the direction of the flow of one of the two fluid media, consisting of sections connected modularly in series, while from one section to the next section the ratio of flow between the two fluid medium changes from countercurrent to cross countercurrent or from cross current to cross countercurrent.

In one known method for making a sparging wall, for example one taught in DE-OS 39 05 696, a fusible band is extruded from an extruder head, cooled, cut up into sheets of the necessary length and width, and, in a discontinuous process, the sheets are first heated in a molding press and then pressed, and then transported out of the molding press. This, therefore, is a cyclic shaping of sheets. The known process is complicated and not very productive, since the molding press performs a heating followed by molding in one cycle, so that the cycling time becomes relatively long.

For the production of a component unit with at least one thickened margin, the known process can be used only with a relatively complicated conversion of the molding press, which adds expense to the process.

It is an object of the present invention to create a process for the production of a component unit, which will be largely continuous, easy to set for a select variable thickness of the plastic film, and permit a high output.

The achievement of this object is accomplished by a generic process with the distinctive features of claim 1. Advantageous embodiments of the process of the invention are set forth in secondary claims 1 to 32.

It is an additional object of the present invention to improve a process of the state of the art so that, when premanufactured sheet material is used, the time required for the production of the module will be shortened and the output will be increased.

The achievement of the additional object is accomplished by a method in accordance with the introductory part of claim 33 with its distinguishing characteristics.

Advantageous embodiments of the process according to claim 33 are set forth in secondary claims 34 to 47.

It is still another purpose of the invention to create an apparatus for the practice of the process of the invention according to one or more of claims 1 to 32.

The achievement of this purpose is accomplished with an apparatus having the features of claim 48, advantageous further developments of the apparatus of the invention being set forth in secondary claims 49 to 63.

An apparatus for performing the process of the invention according to claim 33 is set forth in claims 56 to 65.

In the process of the invention according to claim 1, a fusible strip is continuously extruded and, after passing through a precooling run is fed to a rotating strip molding press, the plastic material having only a solidified skin when the fusible strip enters the strip molding press and is virtually still molten in its interior. The strip molding press operates on the principle of two confronting, circulating caterpillar chains, and shapes the fusible strip to a structured plastic sheet. Provision is advantageously made so that individual molds which shape the strip are still at a distance from the fusible strip in the turnaround area and not until after first contact with the fusible strip are they brought together. In this manner distortions of the fusible strip are prevented, such as would occur if the fusible strip were to come in contact with the trains of molds at the turnarounds of the latter. By means of the individual mold bodies which are in close contact with one another the fusible strip is shaped to a desired structure.

In order also to produce selectively thickened areas during the shaping in the molding press, it is desirable that the pressing force of the molds be adjustable.

By varying the length of the precooling run it is advantageously possible to control the degree of cooling and thus to produce a certain presolidification in the fusible strip. The cooling can be performed simply by the ambient air or also by a cooling fluid applied for the purpose.

Advantageously, provision is made for the extruder head and the strip molding press to be variable in their position relative to one another in a second dimension, i.e., especially for the extruder head to be adjustable in a direction perpendicular to the plane of the fusible strip. For example, it is advisable in the case of an especially fluid melt to shift the extruder head upward, since the fusible strip will sag on the way from the extruder head to the point of entry into the strip molding press.

The direction of movement A of the fusible strip can best be adapted to the plastic material, and it may be advantageous, depending on the type of plastic and its behavior, for its alignment to be horizontal to vertical, the strip running downwardly in the latter case.

The required width of the shaped plastic surface issuing from the strip molding press is roughly established by adjusting or selecting the width of the slot of the extruder head, and it is finely adjusted by applying a tension to the molten strip during operation, the tensile force being created by different velocities of the molten strip between the extruder head and the molding strip press that follows. Increasing the velocity at the press, for example, increases the tension and makes the molten strip narrower, and vice versa.

The setting of desired and even differing thicknesses in controlled areas can advantageously be achieved by different technical methods:

A melt shaping tool can be provided on the extruder head corresponding to its gap width; a melt shaping tool with flexibly adjustable gap defining means can be used; the melt shaping tool can be given different temperatures over its width, so as to reduce the material flow in cooler zones and thus thin the fusible strip, and vice versa; the molds of the strip molding press can be so configured that the distance between two confronting molds varies over the width of the fusible strip; the molds of the strip molding press can be made flexible; the molds can be divided transversely of the fusible strip into individual segments which are adjustable separately in their distance from confronting molds.

The plastic sheets shaped in the strip molding press are then cut to length, this being done by cutting, sawing, chopping, by melting with a hot wire or knife, or by any other appropriate method, and then they are laid down flat or rolled or folded in layers.

To achieve a higher productivity, provision can be made for shaping a plastic sheet with at least double or several times the mold width and then dividing it lengthwise. If the plastic sheet is made in double mold width, a molten longitudinal edge remains at the individual plastic sheets present after the division, which then can best be on the side subject to greater stress. If fusion methods are used for the lengthwise division, all of the edges of the plastic sheets then developing will still be molten edges. In the fusion methods of division, they can be hot-wire, hot-knife or laser beam dividing methods.

For many applications it may be advantageous to make additional connections available in the component unit through the flow paths formed by the plastic surfaces. For this purpose at least part of the plastic sheets are provided on a portion of their area with openings selectively disposed. The openings can be produced, for example, by thermal or mechanical methods.

Advantageously, the shaped plastic sheets are let stand for a period of about one hour to several days to ripen the structure. Structure ripening can be understood to mean, for example, curing or post-crystallization in the case of partially crystalline polymers.

Expediently, several plastic sheets are stacked nested and/or within stakes while curing. The individual plastic sheets will thus become very stable in shape, and also very good uniformity of shape and dimensional accuracy among the individual plastic sheets is assured.

In an additional process step, the individual plastic sheets for the component units are then joined together, this being accomplished by superimposing one plastic sheet in its original position on the plastic sheet next following after turning it 180°, and so on. The plastic sheets are at the same time so shaped that areas of the adjacent plastic sheets that are flattened by the stacking will be in contact with one another. After one plastic sheet is laid on the other, the bonding at the flattened areas provided for the purpose is performed by a bonding apparatus, such as a welding apparatus with a plurality of applicable electrodes, such bonding being performed at least at the longitudinal margins and, depending on the width of the plastic sheets, also on a center line or on a plurality of center lines. Welding is performed preferably in the form of pulsed thermowelding, i.e., by a current passed briefly through the electrodes and resulting in the rapid heating of an ohmic resistance element present at the tip of the electrode.

It is also advantageously provided that the individual welding electrodes are in the form of spring-biased plungers in order to assure contact between the electrodes and the plastic sheet under a substantially constant force. At the margin of the plastic sheet, abutments can also be provided which can be introduced from the long sides of the component unit and set below the individual spot welds. In the central part of the plastic sheets the welding is performed without abutments, simply against the backing provided by the plastic sheet beneath them. The electrodes are preferably not heated until after they have been placed on the film. After the heating ends the electrodes will remain on the film for a sufficient cooling time and will not be lifted away until after that, while the welding power is controllable by varying current, voltage and/or welding time. To save bulk the welding system can be made mobile for the purpose of making the component units at the site of their anticipated installation, by welding together the individual plastic sheets. During transportation the individual plastic sheets are then stacked nested in one another as mentioned before, and they can be allowed to cure while they are being transported in this manner.

Advantageously, the fusible strip before entering the strip molding press is shaped in a pair of rollers having raised areas and depressions on their circumference, so that selectively thickened areas develop on the molded fusible strip, and also persist in the formed plastic sheet.

In an advantageous embodiment of the process a narrow plastic strip is extruded parallel to the fusible strip with an additional extruder head, and immediately after emerging from the extruder head, in the still almost fluid state, it is brought together with the marginal area or other area of the fusible strip that is to be thickened, so that an integral body is made having no boundary areas or inhomogeneities. The fusible strip issuing from the first extruder head can then have a constant thickness over its entire width.

Alternatively thereto, a selective change in the thickness of the fusible strip is achieved as it is shaped in the strip molding press by selectively controlling the temperature of areas of molds or individual moldings by means of controllable heating and/or cooling devices. More greatly heated areas of the fusible strip are thereby shaped to a lesser thickness and vice versa.

At the weld points situated at the margin, plastic clips of U-shaped cross section or sections of molding can be attached so as to make a greater mass of plastic available for the welding, and in order to provide temporarily for a certain mechanical integrity.

Between two molded plastic sheets it may be advantageous to inlay, if necessary, an additional plastic sheet, either plain or textured or perforated or of a mesh-like structure to improve the stiffness of the finished component unit; this additional plastic sheet can previously be provided also with selectively disposed openings which are produced either by the molding of the plastic sheets or are created afterward in a continuous punching apparatus, for example. The punching waste that is created in the latter case can be remelted and reused.

Furthermore, individual plastic sheets can be made with an increased width and these plastic sheets can be distributed in the component unit to form spacers on the entrance and/or exit side. The width increase in this case preferably ranges from 0.5 to 5%. Spacers formed in this manner offer an advantageous functional service, especially in the stacking of component units one on the other, thereby forming relatively large transitional areas at the transitions from the one to the next-following component unit between the plastic sheets of increased width, which offer a more advantageous distribution and/or less resistance to the flow of the fluids. In this connection, provision can also be made for the plastic sheets of enlarged width to be heavier, i.e., especially with a greater thickness of material than the unwidened plastic sheets, in order to make their size proportional to their increased stress.

Another advantageous embodiment of the invention provides that the fusible strip is not made in the form of a flat sheet but with two or more hollow areas in the form of channels which then are available to carry a flow longitudinally. The hollow areas can be separated from one another or can be joined together transversely. Also, the hollow areas can be shaped in the course of the later shaping operation, e.g., can also be provided with interruptions at established intervals. In the latter embodiment, cross connections must be allowed to remain to assure passage of a current.

Finally, it is also advantageous to fluorinate the fusible strip or the shaped plastic sheets so as to vary the area energy of the plastic such that it will be more easily wettable by the media or fluids flowing through it, as well as by connecting substances such as adhesive, and make gluing possible, as well as improved component unit performance in operation.

In the process of the invention, in accordance with claim 33, in a continuous operation, a premanufactured plastic film is heated in a heating system before being fed to a continuous strip molding press. Even in the case of the use of premanufactured films the time required for shaping the film will thus be short and the rate of production high.

The heating is advantageously performed by radiant heat; the heating can be supplemented by preheating by means of heat-transfer contact areas, wherein these contact areas preferably perform a certain preliminary shaping of the film before it is finish-shaped in the strip molding press. In the strip molding press the film is then finish-shaped and sufficiently cooled.

The strip shaping press used is advantageously the same in its configuration as that of the process to be described further below; likewise, the curing of the structure and the joining of a plurality of finish-shaped plastic sheets are performed as in the process described previously, so that reference is made to the previous statements to avoid repetition.

The apparatus for the performance of the process according to claim 1, with the embodiments described in the secondary claims referred back thereto, have an extruder known in itself with a corresponding extruder head. Furthermore, at least one melt shaping mold, a continuously operating strip molding press, an apparatus for dividing and laying flat and/or winding up and/or folding the plastic sheets produced, and at least one cyclically operating assembling system are provided.

The melt shaping mold permits a variety of shapes for the fusible strip:

The distribution of the thicknesses of the fusible strip can be controlled by gap-width adjusting means; the same effect can be achieved by heating and/or cooling systems.

Additional devices on the fusion shaping tool, for example in the form of probes, permit the introduction of a cooling fluid, air for example, into thickened, hollow areas, resulting in the formation of elongated passages in the fusible strip, which undergo a preliminary solidification by the cooling.

A selected thickness distribution in the fusible strip can also be achieved by an appropriately shaped pair of rolls, the fusible strip being preferably produced at first with a uniform thickness.

The strip molding press used in the next section of the process likewise offers a plurality of possible configurations for the finished plastic sheet:

The molding strips are interchangeable and can be selected for the desired structure of the plastic sheets. The arrangement of the mold bodies is variable, and elastically deformable mold bodies and/or controlled-temperature mold bodies, i.e., mold bodies that can be controlledly heated and/or cooled, can be used for the purpose of varying the thickness of selected areas of the plastic sheets.

The molding strips are driven usually at the rollers or gears or crown gears, for example, by controlled electric motors and/or hydraulic drives.

It is advantageously provided that the extruder and/or the molding strip press be movable in order to vary the distance between the two and thus the length of the preliminary cooling run.

The cutting of the finish-shaped plastic sheets is performed in an apparatus known in itself by sawing, cutting, severing with a hot wire or other known methods. Optionally the plastic sheet can also be wound up in a winder or folded in layers.

The fastening of the plastic sheets is performed cyclically in an apparatus, preferably by simultaneous welding at the preferably thickened fastening points, the welding apparatus having a corresponding number of welding electrodes with resistance elements at their tips. The electrodes are in the form of spring-biased plungers and their welding power is controlled individually or in groups by varying the current and/or voltage and/or time.

At least the welding apparatus can best be mobile to permit it to be used at the site where the component units are to be used and thus to save transport bulk, since the plastic sheets can be transported in a nested, and hence space-saving manner. If necessary, the entire apparatus for the production of the component units can be made mobile.

For the performance of the process according to claim 33 and the corresponding developments, the same strip molding press and the same welding apparatus as described above can be used, while additionally a heating system is provided in the process step ahead of the strip molding press.

The heating system has heat radiators, for example in the form of infrared lamps, or at least one heating sheet can be provided additionally or alternatively, which is preferably of such a structure that the later structure of the plastic sheet will be at least partially formed therein.

Embodiments of the apparatus and of the fusible strip will be explained below in a drawing, wherein.

Figure 1:
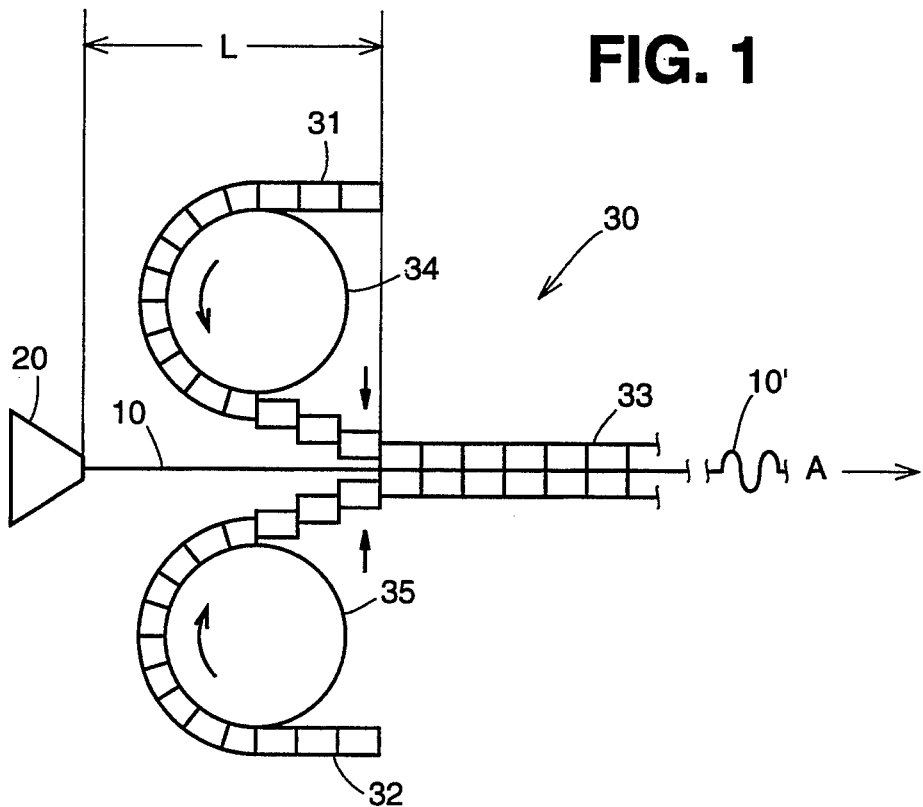
FIG. 1 shows very schematically a side view of an extruder head with the entrance of a fusible strip into a strip molding press.

In FIG. 1, a fusible strip 10 passes in direction A from an extruder head 20 and through a preliminary cooling run L until it enters into a strip molding press 30 of which only the front cylinders 34 and 35 are represented, on which molding strips 31 and 32 run. The molding strips 31, 32, have a plurality of mold bodies 33 which, at the end of the preliminary cooling run L, are shifted toward the fusible strip 10 and produce the deformation. The fusible strip 10, after passing through the strip molding press 30, is shaped to form a structured plastic sheet 10' and sufficiently cooled.

Figure 2:
FIG. 2 is an edge view of one configuration of a plastic sheet.

In FIG. 2 a molding 14 [40?] of plastic, which has a generally U-shaped cross section is pushed laterally onto the margin of a plastic sheet.

Figure 3:
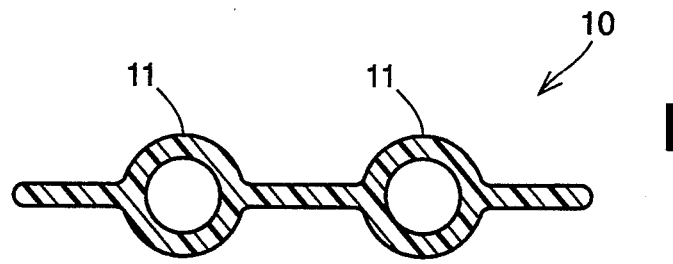
FIG. 3 shows a cross section through another configuration of a fusible strip.

FIG. 3 shows an embodiment of a fusible strip 10 in which two elongated channels 11 are formed by a correspondingly configured fusion shaping tool.

We claim:

1. Method for making a component unit for heat exchanger, substance exchanger and/or bioreactor systems, with at least two walls of embossed thermoplastic sheets, comprising: issuing a fusible strip from a melt shaping tool on an extruder head, passing the fusible strip through a preliminary cooling run, introducing the fusible strip into a strip molding press after the cooling run, and continuously molding the fusible strip in the strip molding press to form an embossed plastic sheet and cooling the sheet to set it, the extruder head having a slot having a width and which method includes first roughly adjusting a width of the shaped plastic sheet molded in the strip molding press by setting or selecting the width of the slot in the extruder head, and finely adjusting the width of the shaped plastic sheet by applying a tensile force to the fusible strip while being molded, the tensile force being applicable through different velocities of the fusible strip between the extruder head and the strip molding press that follows.

2. Method according to claim 1, which includes utilizing flexibly deformable mold bodies in the strip molding press.

3. Method according to claim 1, which includes utilizing in the strip molding press mold bodies divided transversely of the fusible strip into individual segments which are adjustable separately as to their distance from confronting mold bodies.

4. Method according to claim 1, in which the fusible strip has a direction of movement which includes adjusting the extruder head and the strip molding press relative to one another and perpendicular to the direction of movement of the fusible strip.

5. Method according to claim 4, in which the direction of movement of the fusible strip is aligned at an angle between 0° and 90° to the horizontal.

6. Method according to claim 1, which includes laying upon one another two cut-off, molded plastic sheets, one of which assumes a turned position, fastening the plastic sheets laid on one another at selected fastening points, and placing an additional plastic sheet on each of the fastened plastic sheets to form a component unit.

7. Method according to claim 6, in which the step of fastening the plastic sheets includes performing welding thereof simultaneously in a bonding apparatus which has a number of welding electrodes corresponding to a number of fastening points and having resistance elements at their tips, which are in the form of resiliently mounted plungers and whose welding powers are controllable singly or in groups.

8. Method according to claim 1, which includes producing at least two passages running in a direction of movement of the fusible strip and spaced apart from one another and from sides in the fusible strip with a melt shaping tool, and filling passages with a cooling fluid with an apparatus fastened tensionally to the melt shaping tool.

9. Method according to claim 8, in which in the strip molding press the passages are at least partially interrupted at predetermined lengths and the lengths of adjacent passages are connected by cross connections.

10. Method according to claim 8, in which the at least two passages are joined together in the strip molding press by cross connections for the passage of fluid through them.

* * * * *